(12) United States Patent
Mune et al.

(10) Patent No.: US 10,115,956 B2
(45) Date of Patent: Oct. 30, 2018

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Shimpei Mune, Kariya (JP); Yusuke Yamashita, Kariya (JP); Motoaki Okuda, Kariya (JP); Tomoaki Tachibana, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 50 days.

(21) Appl. No.: 15/128,741

(22) PCT Filed: Mar. 11, 2015

(86) PCT No.: PCT/JP2015/057116
§ 371 (c)(1),
(2) Date: Sep. 23, 2016

(87) PCT Pub. No.: WO2015/146584
PCT Pub. Date: Oct. 1, 2015

(65) Prior Publication Data
US 2017/0125783 A1    May 4, 2017

(30) Foreign Application Priority Data

Mar. 27, 2014 (JP) .................................. 2014-066616
Jun. 11, 2014 (JP) .................................. 2014-120664

(51) Int. Cl.
*H01M 2/34* (2006.01)
*H01M 2/06* (2006.01)
(Continued)

(52) U.S. Cl.
CPC .............. *H01M 2/34* (2013.01); *H01G 11/26* (2013.01); *H01G 11/52* (2013.01); *H01G 11/74* (2013.01);
(Continued)

(58) Field of Classification Search
CPC ............ H01M 2/34; H01M 2/02; H01M 2/12; H01M 2/06; H01M 2/26; H01M 2/30
See application file for complete search history.

(56) References Cited

U.S. PATENT DOCUMENTS

2006/0073382 A1    4/2006  Urano et al.
2011/0183193 A1    7/2011  Byun et al.
(Continued)

FOREIGN PATENT DOCUMENTS

JP    10-302751 A    11/1998
JP    2006-100097 A    4/2006
(Continued)

OTHER PUBLICATIONS

Machine Translation of: JP 2014/044871 A, Nishihara, Mar. 13, 2014.*
(Continued)

*Primary Examiner* — Kenneth J Douyette
(74) *Attorney, Agent, or Firm* — Sughrue Mion, PLLC

(57) ABSTRACT

An electricity storage device includes an electrode assembly, a case, a first terminal, and a second terminal. The electrode assembly includes one or more first electrodes and one or more second electrodes, which are stacked alternately with one or more separators in between. The case accommodates the electrode assembly. The first terminal and the second terminal are located on a wall portion of the case. First tabs and second tabs are provided on ends of the first and second electrodes, respectively. A circuit breaker is arranged between the second terminal and the electrode assembly. A (Continued)

part of the first terminal and the first tabs are arranged along the width direction of the electrode assembly, and the circuit breaker and the second tabs are arranged along the width direction of the electrode assembly.

11 Claims, 6 Drawing Sheets

(51) Int. Cl.
    *H01M 2/26*      (2006.01)
    *H01G 11/26*      (2013.01)
    *H01G 11/52*      (2013.01)
    *H01G 11/78*      (2013.01)
    *H01G 17/00*      (2006.01)
    *H01G 11/74*      (2013.01)
    *H01M 2/30*      (2006.01)

(52) U.S. Cl.
    CPC ............. *H01G 11/78* (2013.01); *H01G 17/00* (2013.01); *H01M 2/06* (2013.01); *H01M 2/266* (2013.01); *H01M 2/307* (2013.01)

(56) References Cited

U.S. PATENT DOCUMENTS

| | | | |
|---|---|---|---|
| 2013/0196186 A1* | 8/2013 | Yokoyama | H01M 2/22 429/53 |
| 2015/0079432 A1 | 3/2015 | Okuda et al. | |
| 2015/0086847 A1 | 3/2015 | Minagata | |
| 2015/0104694 A1 | 4/2015 | Okuda et al. | |
| 2015/0207132 A1 | 7/2015 | Minagata et al. | |

FOREIGN PATENT DOCUMENTS

| | | | |
|---|---|---|---|
| JP | 2006-210116 A | 8/2006 |
| JP | 2011-154991 A | 8/2011 |
| JP | 2012-119183 A | 6/2012 |
| JP | 2013-201113 A | 10/2013 |
| JP | 2013-206608 A | 10/2013 |
| JP | 2013-229156 A | 11/2013 |
| JP | 2014-26867 A | 2/2014 |
| JP | 2014-44871 A | 3/2014 |
| JP | 2014-67532 A | 4/2014 |
| WO | 2013/154166 A1 | 10/2013 |
| WO | 2013/157433 A1 | 10/2013 |
| WO | 2014/014026 A1 | 1/2014 |

OTHER PUBLICATIONS

International Search Report of PCT/JP2015/057116, dated May 12, 2015. [PCT/ISA/210].

Communication dated Aug. 1, 2017 from the German Patent and Trademark Office in counterpart application No. 11 2015 001 486.1.

* cited by examiner

ELECTRICITY STORAGE DEVICE

CROSS REFERENCE TO RELATED APPLICATIONS

This application is a National Stage of International Application No. PCT/JP2015/057116filed Mar. 11, 2015, claiming priority based on Japanese Patent Application Nos. 2014-066616, filed Mar. 27, 2014 and 2014-120664, filed Jun. 11, 2014, the contents of all of which are incorporated herein by reference in their entirety.

TECHNICAL FIELD

The present invention relates to an electricity storage device.

BACKGROUND ART

A type of a rechargeable battery, which is an electricity storage device, has been known that includes an electrode assembly and a case for accommodating the electrode assembly. The electrode assembly includes, for example, first electrodes, second electrodes, which are stacked alternately with separators in between. For example, refer to Patent Document 1. Patent Document 1 discloses a rechargeable battery that includes a first conductor and a second conductor. The first conductor electrically connects first tabs at one end of first electrodes to a first terminal in a case. The second conductor electrically connects second tabs at one end of second electrodes to a second terminal in the case. The rechargeable battery also includes a circuit breaker, which cuts off the current through the conductors.

PRIOR ART DOCUMENTS

Patent Documents

Patent Document 1: Japanese Laid-Open Patent Publication No. 2014-26867

SUMMARY OF THE INVENTION

Problems that the Invention is to Solve

The tabs and the circuit breaker are arranged in the case. Part of each terminal protrudes into the case in some cases. Thus, an installation space for these components must be made in the case. In this case, since the space inside the case is limited, if a large installation space is required, the electrode assembly must be reduced in size accordingly. This may cause a drop in the energy density of the rechargeable battery. However, increase in the size of the case in an attempt to create a sufficient installation space for an electrode assembly and other components would increase the size of the rechargeable battery, which is not desirable.

It is an objective of the present invention to provide an electricity storage device that allows tabs and a circuit breaker to be arranged in a desirable manner.

Means for Solving the Problems

To achieve the foregoing objective and in accordance with one aspect of the present invention, an electricity storage device is provided that includes an electrode assembly, in which one or more first electrodes and one or more second electrodes, which are electrodes, are stacked alternately with one or more separators in between, a case, which accommodates the electrode assembly, and a first terminal and a second terminal, which are exposed to an outside from a wall portion of the case, a part of each terminal protruding toward the electrode assembly. Each first electrode has a first tab, which has a shape protruding from an end of the first electrode. Each second electrode has a second tab, which has a shape protruding from an end of the second electrode. The electrode assembly has an end face on which the first and second tabs are located, the end face facing the wall portion. The electricity storage device further includes a circuit breaker, which is arranged between the second terminal and the electrode assembly and is joined to the second terminal, a first conductor, which is joined to the first tabs and the first terminal, and a second conductor, which is joined to the circuit breaker and the second tabs. The first conductor has a first bend portion, which is bent into a shape of a crank when viewed along a stacking direction of the electrodes. The second conductor has a second bend portion, which is bent into a shape of a crank when viewed along a stacking direction of the electrodes. A direction that is perpendicular to both the stacking direction of the electrodes and a direction along which the wall portion and the end face face each other is defined as a width direction of the electrode assembly. A part of the first terminal and the first tabs are arranged along the width direction of the electrode assembly. The circuit breaker and the second tabs are arranged along the width direction of the electrode assembly.

MODES FOR CARRYING OUT THE INVENTION

First Embodiment

Figure 3:
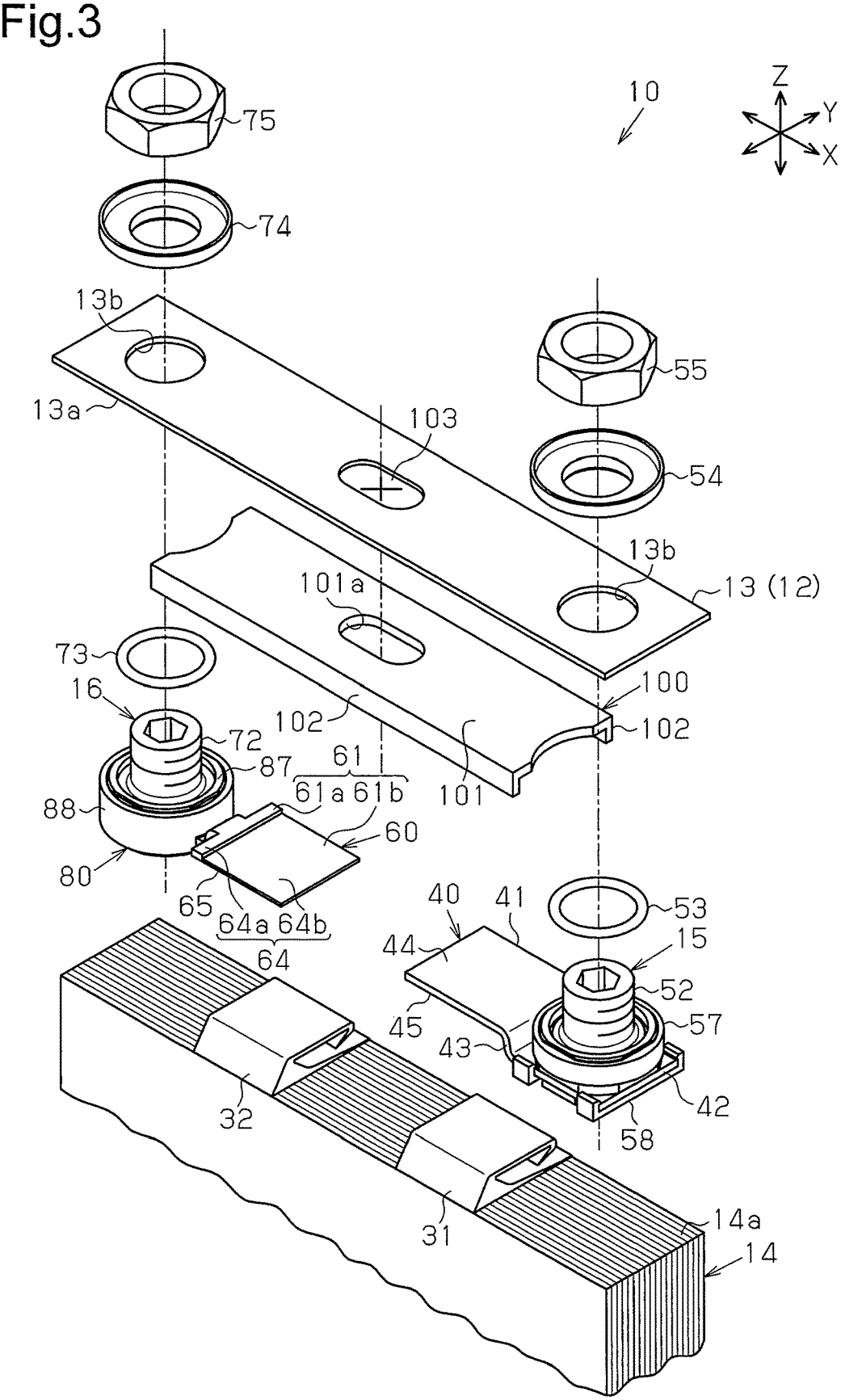
FIG. 3 is an exploded perspective view of the rechargeable battery shown in FIG. 1.
Figure 4:
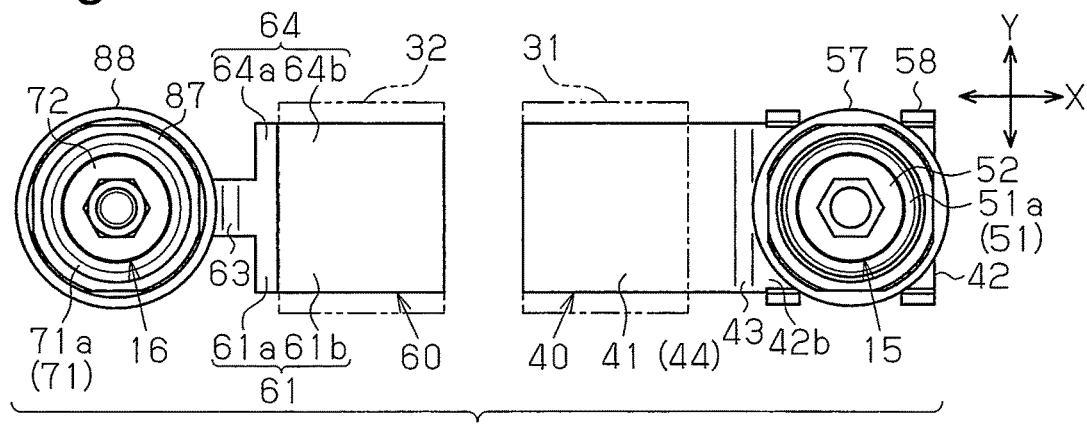
FIG. 4 is a top view of the positive conductor, the negative conductor, the negative terminal, and the negative electrode.
Figure 5:
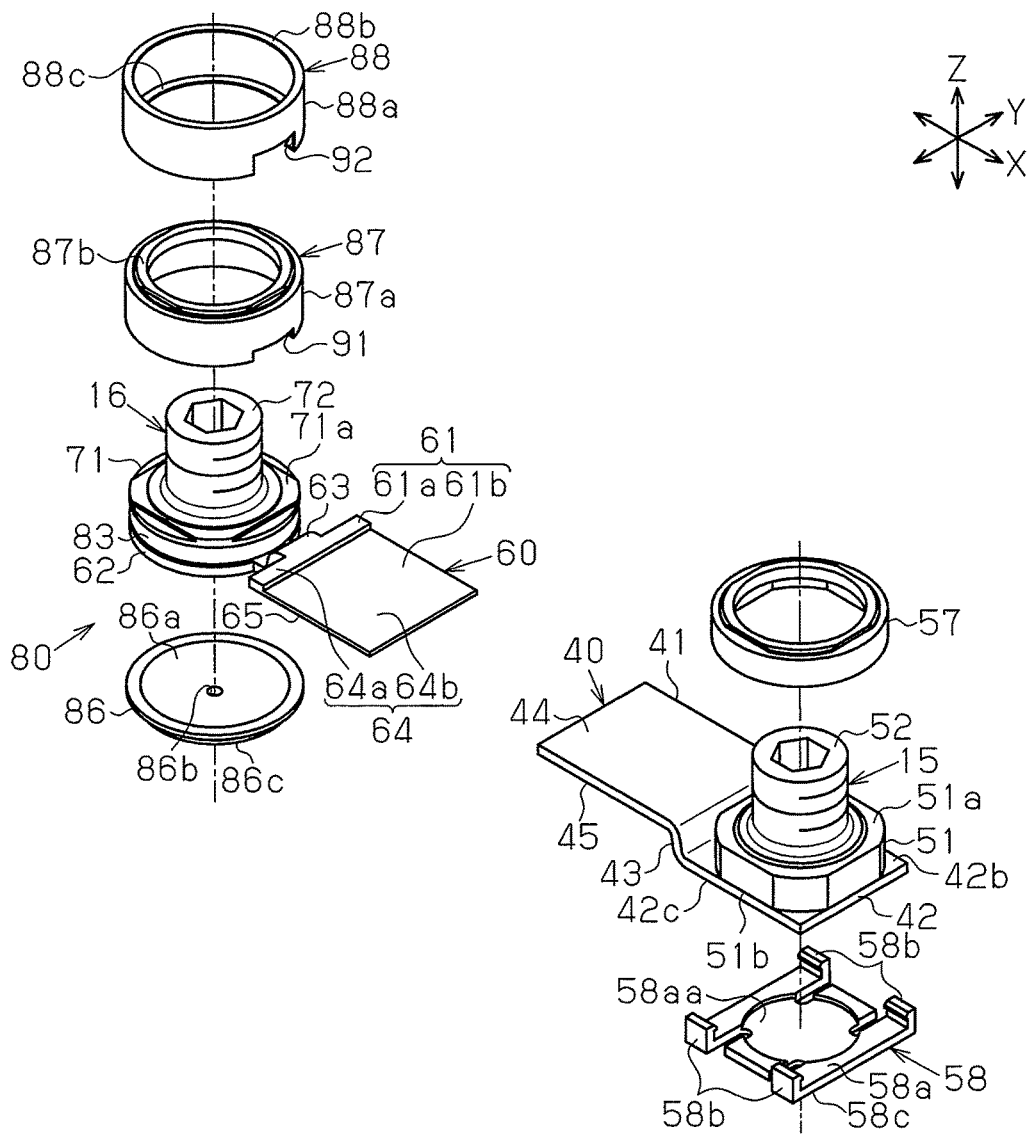
FIG. 5 is an exploded perspective view of a joining structure of the positive conductor and the positive terminal and a joining structure of the negative conductor and the negative terminal.
Figure 6:
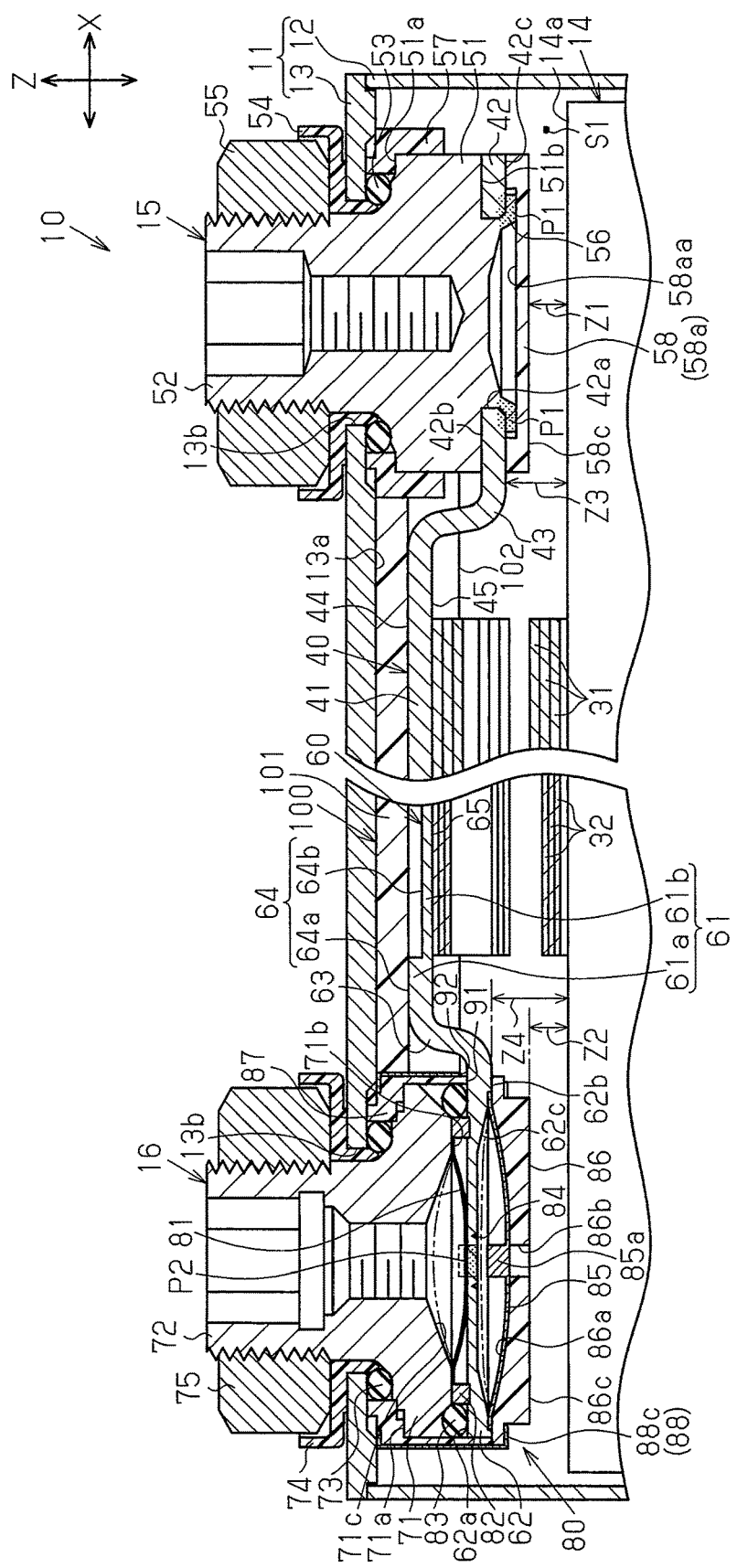
FIG. 6 is a cross-sectional view taken along line 6-6 in FIG. 1.

An electricity storage device according to a first embodiment will now be described with reference to FIGS. 1 to 7. In FIG. 4, tabs 31, 32 are shown by long dashed double-short dashed lines. In FIG. 6, welded parts P1, P2 are shown as dotted regions.

Figure 1:
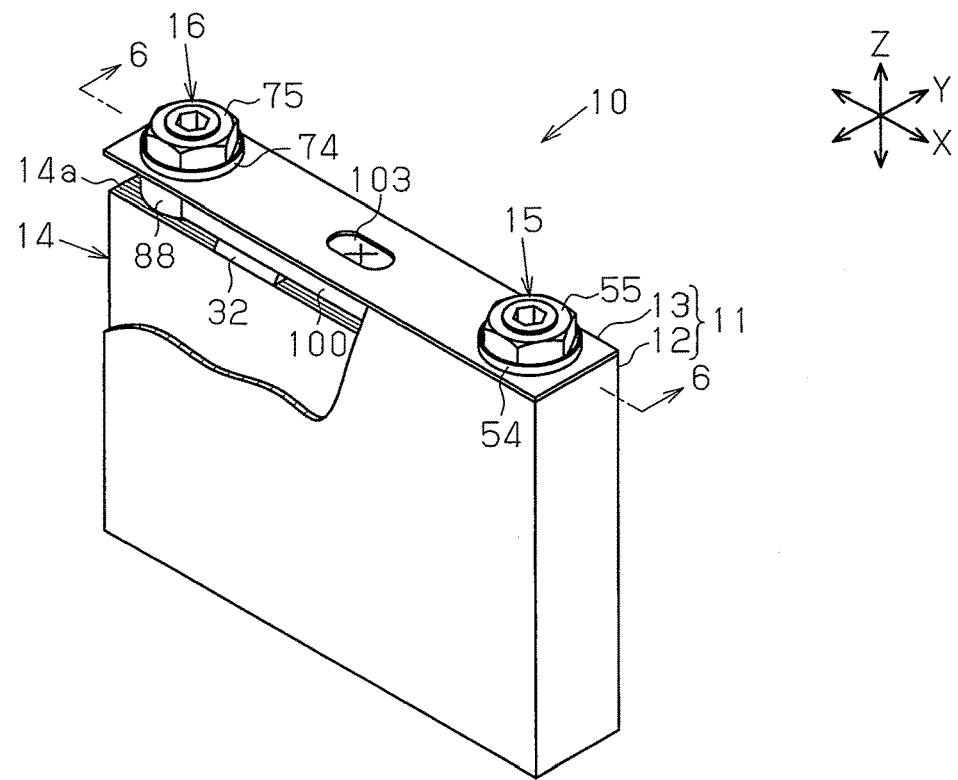
FIG. 1 is a perspective view showing a rechargeable battery according to a first embodiment.

As shown in FIG. 1, a rechargeable battery 10, which is an electricity storage device, has a rectangular parallelepiped case 11. The case 11 includes a case body 12 and a lid 13. The case body 12 is shaped as a box that opens in one direction and has a bottom. The lid 13 is a rectangular flat plate adapted to close the opening of the case body 12. The case body 12 and the lid 13 are joined to each other, for example, by welding.

The rechargeable battery 10 includes an electrode assembly 14, electrolytic solution (not shown), a positive terminal 15, and a negative terminal 16. The electrode assembly 14 and the electrolytic solution are accommodated in the case 11. The positive terminal 15 and the negative terminal 16 exchange electricity with the electrode assembly 14. The terminals 15, 16 are located on and extend through the lid 13 of the case 11. The terminals 15, 16 are exposed to the outside from the case 11. The lid 13 corresponds to a wall portion on which the terminals 15, 16 are located. In the present embodiment, the rechargeable battery 10 is, for example, a lithium-ion battery.

Figure 2:
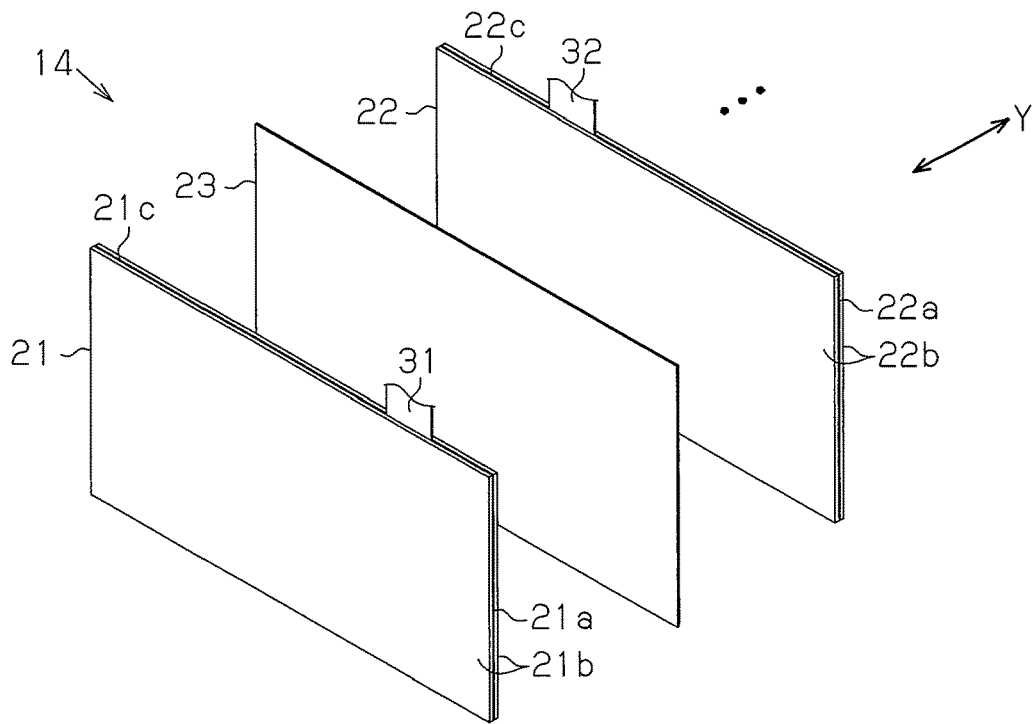
FIG. 2 is an exploded perspective view of the electrode assembly.

As shown in FIG. 2, the electrode assembly 14 includes positive electrodes 21 and negative electrodes 22, which are stacked alternately with separators 23 in between. The separators 23 are porous films through which ions responsible for electric conduction can pass. The electrodes 21, 22 and the separator 23 are rectangular sheets.

The positive electrode 21 includes a rectangular positive-electrode foil 21a and a positive-electrode active material layer 21b on either side of the positive-electrode foil 21a. The positive-electrode foil is, for example, an aluminum foil. The negative electrode 22 includes a rectangular negative-electrode foil 22a and negative-electrode active material layers 22b on either side of the negative-electrode foil 22a. The negative-electrode foil is, for example, a copper foil. When constituting the electrode assembly 14, the positive-electrode active material layers 21b are covered with the negative-electrode active material layers 22b, and the electrodes 21, 22 are covered with the separators 23.

As shown in FIG. 2, the positive electrode 21 includes a positive-electrode tab 31, which protrudes from an end 21c of the positive electrode 21. Likewise, the negative electrode 22 includes a negative-electrode tab 32, which protrudes from an end 22c of the negative electrode 22. The thickness of the negative-electrode tab 32 is smaller than that of the positive-electrode tab 31.

The electrodes 21, 22 are stacked such that the tabs 31, 32 of the same polarity are arranged in a line. As shown in FIG. 3, the negative-electrode tabs 32 are gathered on one side in the direction of a stacking direction Y the electrodes 21, 22 and are folded back in the gathered state toward the opposite side. Likewise, the positive-electrode tabs 31 are gathered on one side in the direction of the stacking direction Y of the electrodes 21, 22 and are folded in the gathered state toward the opposite side. In the present embodiment, the negative-electrode tabs 32 and the positive-electrode tabs 31 are folded back in the same direction. The electrode assembly 14 is accommodated in the case 11 with an end face 14a on which the tabs 31, 32 are located and an inner face 13a of the lid 13 facing each other. In this case, a predetermined space S1 exists between the end face 14a and the inner face 13a (refer to FIG. 6).

In the following description, a direction along which the end face 14a of the electrode assembly 14 and the lid 13, which is a wall portion of the case 11, face each other is defined as a facing direction Z. A direction that is perpendicular to both the facing direction Z and the stacking direction Y of the electrodes 21, 22 is defined as a width direction X of the electrode assembly 14. The facing direction Z is perpendicular to the end face 14a and the inner face 13a of the lid 13.

For purposes of illustration, the direction along the facing direction Z from the end face 14a of the electrode assembly 14 toward the lid 13 will be referred to an upward direction, and the direction along the facing direction Z from the lid 13 toward the end face 14a of the electrode assembly 14 will be referred to as a downward direction. In this case, the facing direction Z is regarded as a vertical direction.

As shown in FIGS. 3 and 4, the rechargeable battery 10 includes a positive conductor 40, which electrically connects the positive-electrode tabs 31 and the positive terminal 15 to each other. The positive conductor 40 is located in the space S1, more specifically, between the lid 13 of the case 11 and the electrode assembly 14, and joined to both the positive-electrode tabs 31 and the positive terminal 15.

The positive conductor 40 is made of a single metal plate, which is, for example, an aluminum plate. The positive conductor 40 includes a positive-electrode tab joint portion 41 and a terminal joint portion 42. The positive-electrode tab joint portion 41 is arranged relatively close to the lid 13 and is joined to the positive-electrode tabs 31. The terminal joint portion 42 is arranged closer to the electrode assembly 14 than the positive-electrode tab joint portion 41 and is joined to the positive terminal 15. Regarding the arrangement of the positive-electrode tab joint portion 41, the arrangement relatively close to the lid 13 refers to an arrangement close to the lid 13 with reference to the positive-electrode tab joint portion 41. That is, the arrangement relatively close to the lid 13 refers to an arrangement between the positive-electrode tab joint portion 41 and the lid 13. The positive conductor 40 has a positive-electrode bend portion 43, which is continuous with both the positive-electrode tab joint portion 41 and the terminal joint portion 42 and is bent into the shape of a crank when viewed along the stacking direction Y of the electrodes 21, 22. In the present description, the bent state includes a bent state with curves and a bent state with angles. The positive-electrode bend portion 43 is from a part that is continuous with the positive-electrode tab joint portion 41 and at which the bending starts to a part that is continuous with the terminal joint portion 42 and at which the bending ends. The positive-electrode bend portion 43 extends along the facing direction Z as a whole.

The manner in which the positive-electrode tab joint portion 41 and the positive-electrode tabs 31 are joined to each other will now be described. As shown in FIG. 4, the positive-electrode tab joint portion 41 is shaped as a rectangular plate that extends along the width direction X of the electrode assembly 14 from the positive-electrode bend portion 43 toward the side opposite from the positive terminal 15. The distal end of the positive-electrode tab joint portion 41 along the width direction X the electrode assembly 14 is located on the same plane as the side face of the positive-electrode tabs 31 closer to the negative-electrode tabs 32. As shown in FIGS. 5 and 6, the positive-electrode tab joint portion 41 has a positive-electrode upper face 44, which faces the inner face 13a of the lid 13, and a positive-electrode lower face 45, which faces the end face 14a of the electrode assembly 14. The positive-electrode upper face 44 and the positive-electrode lower face 45 extend along the stacking direction Y of the electrodes 21, 22 and the width direction X of the electrode assembly 14. The positive-electrode lower face 45 contacts the positive-electrode tabs 31. The positive conductor 40 and the positive-electrode tabs 31 are electrically connected to each other by welding contacting parts of the positive-electrode lower face 45 and the positive-electrode tabs 31 to each other.

The manner in which the terminal joint portion 42 is joined to the positive terminal 15 will be described together with a description of the positive terminal 15.

As shown in FIGS. 5 and 6, the positive terminal 15 includes a prismatic positive-electrode head 51 and a positive electrode shaft 52, which extends upward from an upper face 51a of the positive-electrode head 51 and has a thread on the outer circumferential surface.

As shown in FIG. 6, the positive electrode shaft 52 protrudes out from the case 11 through a through-hole 13b in the lid 13. An insulating O-ring 53 and an insulating flanged ring 54 are attached to the positive electrode shaft 52. The flanged ring 54 is fitted to the through-hole 13b. That is, the positive electrode shaft 52 is passed through the O-ring 53 and the flanged ring 54. A nut 55 is threaded to the positive electrode shaft 52 from above the flanged ring 54 so that the positive terminal 15 and the lid 13 are unitized. The flanged ring 54 is located between the positive electrode shaft 52 and the periphery of the through-hole 13b of the lid 13 and between the nut 55 and the lid 13.

The positive-electrode head 51 is located in the space S1 inside the case 11 and protrudes toward the electrode assembly 14 from the inner face 13a of the lid 13. Positive-electrode welding lugs 56 protrude downward from a lower face 51b of the positive-electrode head 51.

As shown in FIGS. 5 and 6, the terminal joint portion 42 of the positive conductor 40 is a rectangular plate that extends along the width direction X of the electrode assembly 14 from the positive-electrode bend portion 43. The terminal joint portion 42 is arranged between the positive-electrode head 51 and the electrode assembly 14. When viewed from above, a part of the terminal joint portion 42 protrudes from the positive-electrode head 51. As shown in FIG. 6, the terminal joint portion 42 of the positive conductor 40 has a welding hole 42a, which is adapted to engage with the positive-electrode welding lugs 56. The positive-electrode welding lugs 56 are engaged with the welding hole 42a. The positive conductor 40 and the positive terminal 15 are electrically connected to each other by welding the positive-electrode welding lugs 56 and the periphery of the welding hole 42a to each other. The welded portion of the positive-electrode welding lugs 56 and the periphery of the welding hole 42a is referred to as a positive-electrode welded part P1.

As shown in FIGS. 5 and 6, the rechargeable battery 10 includes a first positive-electrode insulator 57 and a second positive-electrode insulator 58. The first positive-electrode insulator 57 has an insulating property and covers a part of the positive-electrode head 51. The second positive-electrode insulator 58 has an insulating property and is located between the terminal joint portion 42 and the end face 14a of the electrode assembly 14.

The first positive-electrode insulator 57 restricts the lid 13 and the positive-electrode head 51 from contacting each other. The first positive-electrode insulator 57 is attached to the positive-electrode head 51 from above to cover the upper face 51a of the positive-electrode head 51 and a part of the outer circumferential surface of the positive-electrode head 51.

The second positive-electrode insulator 58 restricts the terminal joint portion 42 and the positive-electrode welding lugs 56 from contacting the end face 14a of the electrode assembly 14. The second positive-electrode insulator 58 includes a rectangular plate-shaped base portion 58a and four engaging claws 58b, which protrude from the base portion 58a toward the terminal joint portion 42. The engaging claws 58b are engaged with a part of the terminal joint portion 42 that protrudes from the outer circumferential surface of the positive-electrode head 51. To prevent the positive-electrode welding lugs 56 from contacting the base portion 58a, the base portion 58a is provided with a recess 58aa, which has a side wall of the same shape as the outer surfaces of the positive-electrode welding lugs 56.

As shown in FIG. 3, the rechargeable battery 10 includes a negative conductor 60, which electrically connects the negative-electrode tabs 32 and the negative terminal 16 to each other. The negative conductor 60 is located in the space S1, more specifically, between the lid 13 of the case 11 and the electrode assembly 14, and joined to both the negative-electrode tabs 32 and a circuit breaker 80, which is integrated with the negative terminal 16.

The negative conductor 60 is made of a single metal plate, which is, for example, a copper plate. As shown in FIG. 6, the negative conductor 60 includes a negative-electrode tab joint portion 61 and a breaker joint portion 62. The negative-electrode tab joint portion 61 is located relatively close to the lid 13 and is joined to the negative-electrode tabs 32. The breaker joint portion 62 is located closer to the electrode assembly 14 than the negative-electrode tab joint portion 61 and is joined to the circuit breaker 80. Regarding the arrangement of the negative conductor 60, the arrangement relatively close to the lid 13 refers to an arrangement close to the lid 13 with reference to the breaker joint portion 62. That is, the arrangement relatively close to the lid 13 refers to an arrangement between the breaker joint portion 62 and the lid 13. The negative conductor 60 has a negative-electrode bend portion 63, which is continuous with both the negative-electrode tab joint portion 61 and the breaker joint portion 62 and is bent into the shape of a crank when viewed along the stacking direction Y of the electrodes 21, 22. The negative-electrode bend portion 63 is from a part that is continuous with the negative-electrode tab joint portion 61 and at which the bending starts to a part that is continuous with the breaker joint portion 62 and at which the bending ends.

The negative-electrode bend portion 63 extends along the facing direction Z as a whole. As shown in FIG. 4, the negative-electrode bend portion 63 has a constricted section constricted along the stacking direction Y of the electrodes 21, 22. Specifically, the width of the negative-electrode bend portion 63, which is the dimension of the negative-electrode bend portion 63 along the stacking direction Y of the electrodes 21, 22 is narrower than the width of the negative-electrode tab joint portion 61.

The manner in which the negative-electrode tab joint portion 61 and the negative-electrode tabs 32 are joined to each other will now be described. As shown in FIG. 4, the negative-electrode tab joint portion 61 is shaped as a rectangular plate that extends along the width direction X of the electrode assembly 14 from the negative-electrode bend portion 63 toward the side opposite from the negative terminal 16. The distal end of the negative-electrode tab joint portion 61 along the width direction X the electrode assembly 14 is located on the same plane as the side face of the negative-electrode tabs 32 closer to the positive-electrode tabs 31. As shown in FIGS. 5 and 6, the negative-electrode tab joint portion 61 has a negative-electrode upper face 64, which faces the inner face 13a of the lid 13, and a negative-electrode lower face 65, which faces the end face 14a of the electrode assembly 14. The negative-electrode upper face 64 and the negative-electrode lower face 65 extend along the stacking direction Y of the electrodes 21, 22 and the width direction X of the electrode assembly 14.

As shown in FIGS. 5 and 6, the negative-electrode tab joint portion 61 has a thick portion 61a and a thin portion 61b, which have different thicknesses. The thick portion 61a is located on the proximal side of the negative-electrode tab joint portion 61. The thin portion 61b is located on the distal side of the negative-electrode tab joint portion 61. Since the thick portion 61a and the thin portion 61b have different thicknesses, the negative-electrode upper face 64 has a step defined by a first face 64a and a second face 64b, which are displaced from each other along the facing direction Z. The first face 64a is the upper face of the thick portion 61a and is closer to the lid 13 than the second face 64b. That is, the first face 64a is located between the second face 64b and the lid 13.

When viewed from above, the thin portion 61b overlaps the entire negative-electrode tabs 32. That is, the negative-electrode tab joint portion 61 has the thin portion 61b at a part that overlaps the negative-electrode tabs 32. A part of the negative-electrode lower face 65 that corresponds to the thin portion 61b contacts and is welded to the negative-electrode tabs 32. That is, the negative conductor 60 and the negative-electrode tabs 32 are electrically connected to each other by welding the thin portion 61b of the negative-electrode tab joint portion 61 and the negative-electrode tabs 32 to each other.

As shown in FIGS. 5 and 6, the negative terminal 16 includes a negative-electrode head 71 and a negative electrode shaft 72, which extends upward from an upper face 71a of the negative-electrode head 71 and has a thread on the outer circumferential surface.

As shown in FIG. 6, the negative electrode shaft 72 protrudes out from the case 11 through a through-hole 13b in the lid 13. An insulating O-ring 73 and an insulating flanged ring 74 are attached to the negative electrode shaft 72. The flanged ring 74 is fitted to the through-hole 13b. That is, the negative electrode shaft 72 is passed through the O-ring 73 and the flanged ring 74. A nut 75 is threaded to the negative electrode shaft 72 from above the flanged ring 74 so that the negative terminal 16 and the lid 13 are unitized. The flanged ring 74 is located between the negative electrode shaft 72 and the periphery of the through-hole 13b of the lid 13 and between the nut 75 and the lid 13.

The negative-electrode head 71 is located in the space S1 inside the case 11 and protrudes toward the electrode assembly 14 from the inner face 13a of the lid 13. A terminal recess 71c is located in a lower face 71b of the negative-electrode head 71. The terminal recess 71c is recessed upward in a conical shape.

The breaker joint portion 62 of the negative conductor 60 is a disk the diameter of which is greater than the width of the negative-electrode bend portion 63. The breaker joint portion 62 is closer to the electrode assembly 14 than the negative-electrode head 71. That is, the breaker joint portion 62 is arranged between the negative-electrode head 71 and the electrode assembly 14. An upper face 62a of the breaker joint portion 62 and the lower face 71b of the negative-electrode head 71 face each other.

The circuit breaker 80 is arranged between the negative terminal 16 and the electrode assembly 14. When the negative terminal 16 is electrically connected to the negative conductor 60 and the pressure in the case 11 exceeds a preset pressure, the circuit breaker 80 breaks the electrical connection between the negative terminal 16 and the negative conductor 60. That is, when the pressure in the case 11 is lower than or equal to the preset pressure, the circuit breaker 80 constitutes a part of the current-carrying path between the negative terminal 16 and the negative-electrode tabs 32. In contrast, when the pressure in the case 11 exceeds the preset pressure, the circuit breaker 80 breaks the current-carrying path.

As shown in FIG. 6, the circuit breaker 80 has a contact plate 81, which is joined to the lower face 71b of the negative-electrode head 71 and the upper face 62a of the breaker joint portion 62. The contact plate 81 is made of a diaphragm made of a conductive material. The contact plate 81 is shaped as a disk and overlaps and covers the terminal recess 71c from below. The outer circumference of the contact plate 81, which protrudes from the terminal recess 71c, and the periphery of the terminal recess 71c at the lower face 71b of the negative-electrode head 71 are welded to each other. A part of the contact plate 81 that faces the terminal recess 71c bulges downward in a normal state. The bulging part of the contact plate 81 and the upper face 62a of the breaker joint portion 62 are welded to each other. That is, the breaker joint portion 62 and the negative-electrode head 71 are electrically connected to each other via the contact plate 81.

An insulating ring 82 is located between the outer circumference of the contact plate 81 and the upper face 62a of the breaker joint portion 62. The contact plate 81 is supported by being held between the insulating ring 82 and the lower face 71b of the negative-electrode head 71. A sealing member 83 is located at a position outside of the insulating ring 82 between the negative-electrode head 71 and the breaker joint portion 62.

A breaker recess 62c is located in a lower face 62b of the breaker joint portion 62. The breaker recess 62c is recessed in a conical shape toward the lid 13. As viewed from above, the bottom face of the breaker recess 62c has a negative-electrode welded part P2 at which the contact plate 81 and the breaker joint portion 62 are welded to each other. A breakable groove 84, which surrounds the breaker recess 62c, is located on the bottom face of the breaker recess 62c. The breakable groove 84 is, for example, annular.

The circuit breaker 80 has a deformable plate 85, which is located below the breaker joint portion 62 and is deformed by the pressure in the case 11. The deformable plate 85 is made of a diaphragm made of a conductive material. The deformable plate 85 is shaped as a disk and overlaps and covers the breaker recess 62c from below. The outer circumference of the deformable plate 85 and the lower face 62b of the breaker joint portion 62 are welded to each other. The deformable plate 85 bulges downward in a normal state. A projection 85a, which protrudes upward, is located in a section of the bulging part that faces the negative-electrode welded part P2. The projection 85a faces the negative-electrode welded part P2, which is surrounded by the breakable groove 84. The deformable plate 85 is configured to bulge upward when receiving an upward pressure greater than a preset pressure from below.

The circuit breaker 80 includes a support member 86, which supports the deformable plate 85 from below. The support member 86 is arranged between the deformable plate 85 and the end face 14a of the electrode assembly 14. The support member 86 is substantially shaped as a disk and has a support recess 86a in the upper face. The support recess 86a is recessed to conform to the deformable plate 85 bulging downward. The support recess 86a has a gas hole 86b at a part of the bottom face that faces the projection 85a. The gas hole 86b extends along the facing direction Z. The support member 86 is thicker than the second positive-electrode insulator 58.

With the above described configuration, the pressure in the case 11 is applied to the deformable plate 85 via the gas hole 86*b*. In this case, when the pressure in the case 11 exceeds the preset pressure, the deformable plate 85 is deformed to bulge upward as indicated by the long dashed double-short dashed line in FIG. 6. Then, the projection 85*a* strikes the negative-electrode welded part P2, which is surrounded by the breakable groove 84, so that the contact plate 81 is deformed to bulge upward. At this time, the negative-electrode welded part P2 of the breaker joint portion 62 is broken so that electrical connection between the breaker joint portion 62 and the negative terminal 16 is broken physically.

As shown in FIGS. 5 and. 6, the rechargeable battery 10 includes a negative-electrode insulator 87 and a swaging member 88. The negative-electrode insulator 87 covers the upper face 71*a* and the outer circumferential surface of the negative-electrode head 71 and has an insulating property. The swaging member 88 unitizes the negative-electrode insulator, the negative-electrode head 71, the insulating ring 82, the sealing member 83, the breaker joint portion 62, the deformable plate 85, and the support member 86.

The negative-electrode insulator 87 is attached to the negative-electrode head 71 from above and restricts the lid 13 and the negative-electrode head 71 from contacting each other. Specifically, as shown in FIG. 5, the negative-electrode insulator 87 includes a cylindrical portion 87*a* and a collar 87*b*, which is located at the upper end in the axial direction of the cylindrical portion 87*a* and extends radially inward. The collar 87*b* covers the upper face 71*a* of the negative-electrode head 71. The cylindrical portion 87*a* covers the outer circumferential surface of the negative-electrode head 71.

The swaging member 88 includes a cylindrical portion 88*a*, an upper collar 88*b*, and a lower collar 88*c*. The upper collar 88*b* and the lower collar 88*c* are located at the opposite ends in the axial direction of the cylindrical portion 88*a* and extend radially inward. The upper collar 88*b* of the swaging member 88 is engaged with the negative-electrode insulator 87, and the lower collar 88*c* of the swaging member 88 is engaged with the step on the outer circumferential surface of the support member 86, so that the components are unitized.

As shown in FIG. 5, the cylindrical portion 87*a* of the negative-electrode insulator 87 has a first escape recess 91 at the lower end in the axial direction. When viewed from above, the first escape recess 91 is located at a position overlapping the negative-electrode bend portion 63. Likewise, the cylindrical portion 88*a* of the swaging member 88 has a second escape recess 92 at the lower end in the axial direction. When viewed from above, the second escape recess 92 is located at a position overlapping the negative-electrode bend portion 63. The escape recesses 91, 92 prevent the negative-electrode insulator 87 and the swaging member 88 from contacting the negative conductor 60.

As shown in FIG. 6, the thickness of the positive-electrode head 51, which is the dimension of the positive-electrode head 51 along the facing direction Z, is greater than the thickness of the negative-electrode head 71, which is the dimension of the negative-electrode head 71 along the facing direction Z. A lower face 86*c* of the support member 86 and a lower face 58*c* of the second positive-electrode insulator 58 are aligned with each other along the facing direction Z are located in the same plane. Specifically, the distance Z1 between the end face 14*a* of the electrode assembly 14 and the lower face 58*c* of the second positive-electrode insulator 58 is set to equal to the distance Z2 between the end face 14*a* of the electrode assembly 14 and the lower face 86*c* of the support member 86.

The terminal joint portion 42, which is arranged closer to the electrode assembly 14 with respect to the positive-electrode head 51, and the breaker joint portion 62, which is arranged closer to the electrode assembly 14 with respect to the negative-electrode head 71, are displaced from each other along the facing direction Z. Specifically, the distance Z3 between the end face 14*a* of the electrode assembly 14 and the terminal joint portion 42 is shorter than the distance Z4 between the end face 14*a* of the electrode assembly 14 and the lower face 62*b* of the breaker joint portion 62.

The bend portions 43, 63 of the conductors 40, 60 are bent in different manners such that the positive-electrode upper face 44 of the positive-electrode tab joint portion 41 and the negative-electrode upper face 64 of the negative-electrode tab joint portion 61 approach each other along the facing direction Z. Specifically, the dimension along the facing direction Z of the positive-electrode bend portion 43 is longer than the dimension along the facing direction Z of the negative-electrode bend portion 63.

"The dimension along the facing direction Z of the positive-electrode bend portion 43" refers to the distance along the facing direction Z, for example, from the positive-electrode lower face 45 to an upper face 42*b* of the terminal joint portion 42. "The dimension along the facing direction Z of the negative-electrode bend portion 63" refers to the distance along the facing direction Z, for example, from the negative-electrode lower face 65 to the upper face 62*a* of the breaker joint portion 62. The upper face 42*b* of the terminal joint portion 42 is a face of the terminal joint portion 42 that contacts the lower face 51*b* of the positive-electrode head 51.

Taking the thicknesses of the bend portion 43, 63 into consideration, "the dimension along the facing direction Z of the positive-electrode bend portion 43" refers to the distance from the positive-electrode upper face 44 to a lower face 42*c* of the terminal joint portion 42, which is on the opposite side from the upper face 42*b*. "The dimension along the facing direction Z of the negative-electrode bend portion 63" refers to the distance along the facing direction Z from the negative-electrode upper face 64 (the first face 64*a*) to the lower face 62*b* of the breaker joint portion 62.

The positive-electrode upper face 44 and the first face 64*a*, which is arranged closer to the lid 13 on the negative-electrode upper face 64, are aligned with each other along the facing direction Z and are arranged on the same plane. In this case, the positive-electrode lower face 45 and the negative-electrode lower face 65 are arranged on the same plane.

In this configuration, as shown in FIG. 6, the negative-electrode head 71, which is a part of the circuit breaker 80 and the negative terminal 16, and the negative-electrode tabs 32 are arranged along the width direction X of the electrode assembly 14. Likewise, the positive-electrode head 51, which is a part of the positive terminal 15, and the positive-electrode tabs 31 are arranged along the width direction X of the electrode assembly 14.

In the present embodiment, the positive terminal 15 corresponds to a "first terminal." The negative terminal 16 corresponds to a "second terminal," and the positive-electrode tabs 31 correspond to "first tabs." The negative-electrode tabs 32 correspond to a "second tabs." The positive conductor 40 corresponds to a "first conductor." The negative conductor 60 corresponds to a "second conductor." The positive-electrode tab joint portion 41 corresponds to a "first tab joint portion." The positive-electrode upper face 44 corresponds to a "first opposed face." The positive-electrode lower face 45 corresponds to a "first tab joint face." The negative-electrode tab joint portion 61 corresponds to a "second tab joint portion." The negative-electrode upper face 64 corresponds to a "second opposed face." The negative-electrode lower face 65 corresponds to a "second tab joint face." The positive-electrode bend portion 43 corresponds to a "first bend portion." The negative-electrode bend portion 63 corresponds to a "second bend portion."

As shown in FIG. 3, the rechargeable battery 10 includes an insulating cover 100, which is arranged between the lid 13 and the set of the positive-electrode tab joint portion 41 and the negative-electrode tab joint portion 61. The insulating cover 100 is made of, for example, plastic. The insulating cover 100 includes a rectangular plate-shaped main body 101 and upright portions 102, which protrude downward from the ends in the transverse direction of the main body 101. When viewed along the width direction X of the electrode assembly 14, the insulating cover 100 has an inverted U shape. As shown in FIG. 6, the insulating cover 100 is arranged to bridge the positive-electrode tab joint portion 41 and the negative-electrode tab joint portion 61. One end in the longitudinal direction of the insulating cover 100 abuts against the outer circumferential surface of the swaging member 88, while the other end abuts against the outer circumferential surface the first positive-electrode insulator 57. The lower face of the insulating cover 100 contacts both the positive-electrode upper face 44 and the first face 64a of the negative-electrode upper face 64.

As shown in FIG. 3, the lid 13 has a pressure relief valve 103 at the center. When the pressure in the case 11 exceeds a relief pressure, the pressure relief valve 103 is opened. The main body 101 of the insulating cover 100 has a through-hole 101a at a position that faces the pressure relief valve 103. When viewed from above, the pressure relief valve 103 and the through-hole 101a are located between the positive-electrode tab joint portion 41 and the negative-electrode tab joint portion 61.

Figure 7:
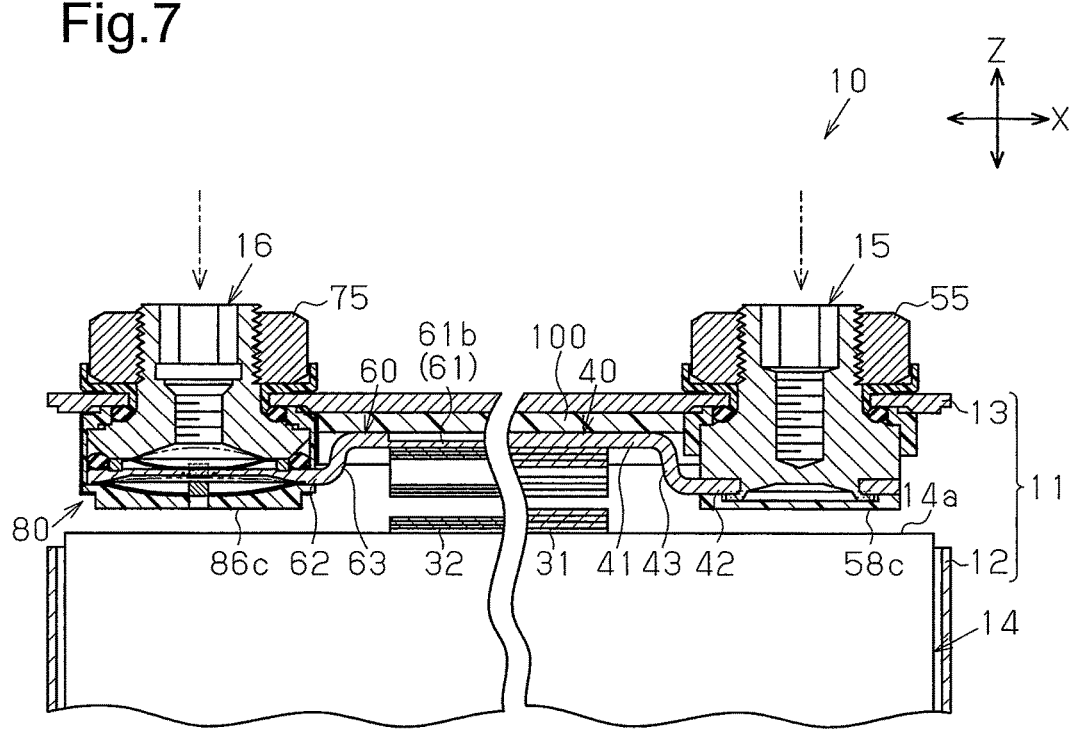
FIG. 7 is a cross-sectional view illustrating a process for manufacturing the rechargeable battery.

A method for manufacturing the rechargeable battery 10 according to the present embodiment will be briefly described. First, the terminals 15, 16 are fixed to the lid 13 by threading the nuts 55, 75. This unitizes the lid 13 with a positive electrode unit, which is configured by components such as the positive terminal 15 and the positive conductor 40. Also, the lid 13 is unitized with a negative electrode unit, which is configured by components such as the negative terminal 16, the circuit breaker 80, and the negative conductor 60. With the positive-electrode tabs 31 and the positive-electrode tab joint portion 41 pressed against each other by a welding jig, the positive-electrode tabs 31 and the positive-electrode tab joint portion 41 are welded to each other. Also, with the negative-electrode tabs 32 and the thin portion 61b of the negative-electrode tab joint portion 61 pressed against each other by a welding jig, the negative-electrode tabs 32 and the thin portion 61b of the negative-electrode tab joint portion 61 are welded to each other, so that the positive electrode unit, the negative electrode unit, the lid 13, and the electrode assembly 14 are unitized. Then, as shown in FIG. 7, the unit assembly configured by components such as the positive electrode unit, the negative electrode unit, the lid 13, and the electrode assembly 14 is inserted into the case body 12 to manufacture the rechargeable battery 10.

Operation of the present embodiment will now be described.

The circuit breaker 80, the negative-electrode tabs 32, the positive-electrode tabs 31, the positive-electrode head 51 are arranged along the width direction X of the electrode assembly 14. Thus, for example, the space S1 is small compared to that in a case in which the tabs 31, 32 are arranged closer to the electrode assembly 14 than the circuit breaker 80 or to the positive-electrode head 51.

The present embodiment, which has been described, has the following advantages.

(1) The rechargeable battery 10 includes the positive conductor 40 and the negative conductor 60. The positive conductor 40 is joined to the positive-electrode tabs 31 and the positive terminal 15. The negative conductor 60 is joined to the negative-electrode tabs 32 and the circuit breaker 80, which is arranged between the negative terminal 16 and the electrode assembly 14. The conductor 40, 60 respectively have bend portions 43, 63, which are each bent into the shape of a crank when viewed along the stacking direction Y of the electrodes 21, 22. The circuit breaker 80 and the negative-electrode tabs 32 are arranged along the width direction X of the electrode assembly 14. The positive terminal 15 includes the positive-electrode head 51, which is located in the case 11 and protrudes toward the electrode assembly 14. The positive-electrode head 51 and the positive-electrode tabs 31 are arranged along the width direction X of the electrode assembly 14. This reduces the space S1.

During welding operation of the tabs 31, 32 and the tab joint portions 41, 61, when the welding jig applies a pressing force to the tab joint portions 41, 61, the bend portion 43, 63 are warped to absorb the stress generated by the pressing force. This restrains the stress from being transmitted to the welded parts P1, P2. Thus, the occurrence of abnormality in the welded parts P1, P2 due to application of external pressure to the welded parts P1, P2 is suppressed. For example, the electrical resistance of the welded parts P1, P2 is restrained from being increased.

Further, when vibrations are applied to the rechargeable battery 10, the bend portions 43, 63 are expected to be warped in response to the vibrations. Thus, since the welded parts P1, P2 are unlikely to be influenced by the vibrations, abnormalities due to the vibrations are restrained in the welded parts P1, P2.

Particularly, the tabs 31, 32 are bent in the direction along the stacking direction Y of the electrodes 21, 22. In this case, vibrations along the stacking direction Y of the electrodes 21, 22 and vibrations along the facing direction Z are easily absorbed by the tabs 31, 32. In contrast, the vibrations along the width direction X of the electrode assembly 14, along which the tabs 31, 32 are twisted, are not likely to be absorbed by the tabs 31, 32. The bend portions 43, 63, which are the crank-shaped parts of the conductors 40, 60, are easily warped along the width direction X of the electrode assembly 14. Accordingly, the bend portions 43, 63 reliably absorb vibrations along the width direction X of the electrode assembly 14. Thus, vibrations along the width direction X of the electrode assembly 14 can be dealt with in a desirable manner.

(2) Instead of below the negative terminal 16, the circuit breaker 80 may be arranged between the negative terminal 16 and the negative-electrode tabs 32. In this case, to create the installation space for the circuit breaker 80, the negative-electrode tabs 32 may be arranged at the center of the end 22c of the negative electrode 22, and the dimension in the longitudinal direction of the negative-electrode tab joint portion 61 may be increased. In such a configuration, since the negative-electrode tabs 32 are arranged below the pressure relief valve 103, the outflow of gas may be hampered by the negative-electrode tabs 32.

In contrast, according to the present embodiment, since the circuit breaker 80 is arranged below the negative terminal 16, such a drawback is avoided. However, since the circuit breaker 80 is located below the negative terminal 16, the dimension along the facing direction Z of the negative electrode unit, which is configured by components such as the negative terminal 16 and the circuit breaker 80, is likely to be increased. The space S1 is likely to be increased, accordingly. In this regard, according to the present embodiment, the negative conductor 60 is bent to horizontally arrange the circuit breaker 80 and the negative-electrode tabs 32. This reliably restrains an increase in the space S1, which would be increased by placing the circuit breaker 80 below the negative terminal 16.

(3) The negative conductor 60 includes the crank-shaped negative-electrode bend portion 63, which has a constricted section. The negative-electrode bend portion 63 is thus easily warped. This reliably allows the negative-electrode bend portion 63 to reduce stress. Accordingly, the stress applied to the negative-electrode welded part P2 is reduced in a more desirable manner.

Particularly, since the negative-electrode welded part P2 is configured to be broken by the circuit breaker 80, the negative electrode weld part P2 is structured to be weaker than the positive-electrode welded part P1. Thus, the negative-electrode welded part P2 is likely to have abnormality due to stress. In contrast, in the present embodiment, the negative-electrode bend portion 63 of the negative conductor 60, which is joined to the circuit breaker 80 and the negative-electrode tabs 32, has a constricted section. Thus, the relatively weak negative-electrode welded part P2 is protected in a more desirable manner.

(4) The positive conductor 40 includes the terminal joint portion 42 and the positive-electrode tab joint portion 41. The terminal joint portion 42 is joined to the positive terminal 15. The positive-electrode tab joint portion 41 is arranged closer to the lid 13 than the terminal joint portion 42 and has the positive-electrode upper face 44. The positive-electrode upper face 44 faces the positive-electrode lower face 45, which is joined to the positive-electrode tabs 31. The positive-electrode upper face 44 also faces the inner face 13a of the lid 13 Likewise, the negative conductor 60 includes the breaker joint portion 62 and the negative-electrode tab joint portion 61. The breaker joint portion 62 is joined to the circuit breaker 80. The negative-electrode tab joint portion 61 is arranged closer to the lid 13 than the breaker joint portion 62 and has the negative-electrode upper face 64. The negative-electrode upper face 64 faces the negative-electrode lower face 65, which is joined to the negative-electrode tabs 32. The negative-electrode upper face 64 also faces the inner face 13a of the lid 13. The terminal joint portion 42 and the breaker joint portion 62 are displaced from each other along the facing direction Z.

In this configuration, the bend portions 43, 63 of the conductors 40, 60 are bent such that the positive-electrode upper face 44 and the negative-electrode upper face 64 approach each other along the facing direction Z. Specifically, the bend portions 43, 63 are bent in different manners taking into consideration the displacement along the facing direction Z between the terminal joint portion 42 and the breaker joint portion 62, such that the positive-electrode upper face 44 and the first face 64a of the negative-electrode upper face 64 are arranged on the same plane. The positive-electrode tab joint portion 41 and the upper end of the negative-electrode tab joint portion 61 are thus flush with each other, restraining the insulating cover 100 from chattering. This also restrains a dead space from being created between the positive-electrode upper face 44 and the insulating cover 100 or between the first face 64a of the negative-electrode upper face 64 and the insulating cover 100.

(5) The lower face 58c of the second positive-electrode insulator 58, which is the lower face of the positive electrode unit, and the lower face 86c of the support member 86, which is the lower face of the negative electrode unit (the circuit breaker 80) are arranged on the same plane. Thus, when the unit assembly configured by components such as the positive electrode unit, the negative electrode unit, the lid 13, and the electrode assembly 14 is inserted in the case body 12, imbalance force is unlikely to be generated. The electrode assembly 14 is therefore prevented from being tilted in the electrode assembly 14 or receiving a localized load.

As described above, when the lower face 58c of the second positive-electrode insulator 58 and the lower face 86c of the support member 86 are made flush with each other, the terminal joint portion 42 and the breaker joint portion 62 are displaced from each other along the facing direction Z. Thus, if the bend portions 43, 63 are bent in the same manner, the positive-electrode upper face 44 and the first face 64a of the negative-electrode upper face 64 are displaced from each other along the facing direction Z.

In contrast, according to the present embodiment, the bend portions 43, 63 are bent in different manners by taking into consideration the displacement along the facing direction Z between the terminal joint portion 42 and the breaker joint portion 62 as described above. This achieves the advantage of the item (4) while avoiding the electrode assembly 14 tilting in the case 11.

(6) The negative-electrode tab joint portion 61 includes the thick portion 61a and the thin portion 61b, which have different thicknesses. In this case, since the thin portion 61b is more easily warped than the thick portion 61a, the negative-electrode welded part P2 is restrained from receiving stress in a more desirable manner.

(7) The part of the negative-electrode lower face 65 that corresponds to the thin portion 61b and the negative-electrode tabs 32 are welded together. This limits the thermal diffusion due to welding, thereby allowing the negative-electrode tab joint portion 61 and the negative-electrode tabs 32 to be welded together in a desirable manner.

(8) Particularly, since the negative-electrode tab joint portion 61 has the thick portion 61a and the thin portion 61b, the negative-electrode upper face 64 has the first face 64a and the second face 64b, which are displaced from each other along the facing direction Z. In this configuration, the bend portion 43, 63 are bent such that the first face 64a, which is the one closer to the lid 13 of the first face 64a and the part of the second face 64b, and the positive-electrode upper face 44 are arranged on the same plane. Accordingly, the advantages of the items (4), (6), and (7) can be simultaneously achieved.

Second Embodiment

The present embodiment is different from the first embodiment in the manner in which the negative-electrode tabs 32 are bent and the manner in which the negative conductor 110 is bent. These differences will now be described.

Figure 8:
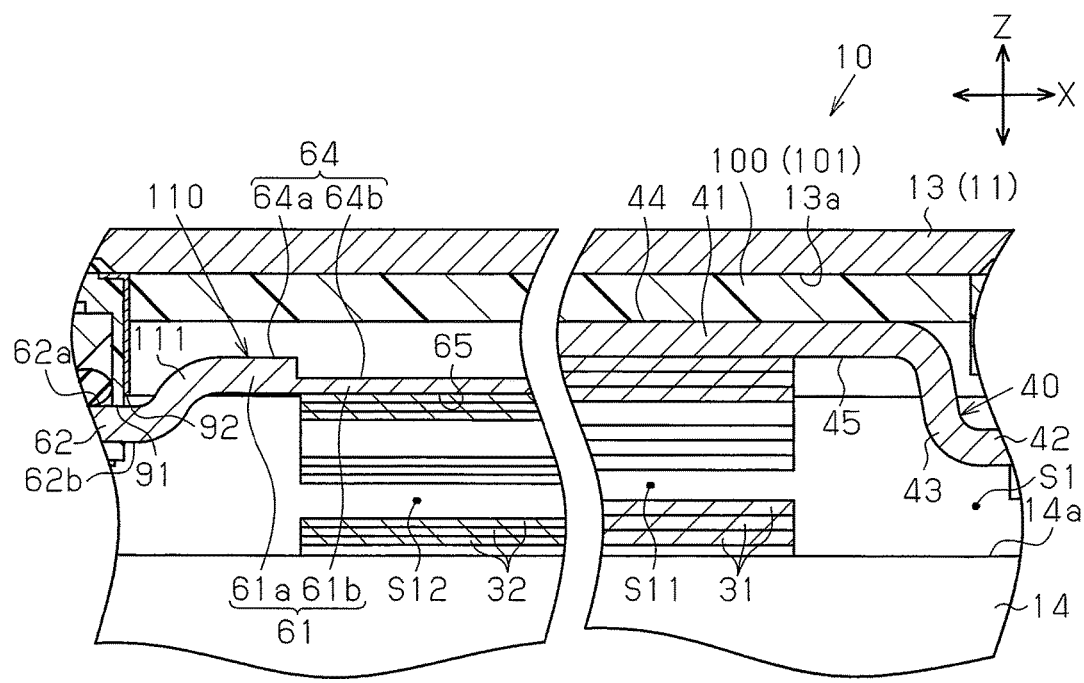
FIG. 8 is a cross-sectional view illustrating a positive conductor and a negative conductor according to a second embodiment.

As shown in FIG. 8, a negative conductor 110 of the present embodiment includes a negative-electrode bend portion 111, which is bent such that the negative-electrode lower face 65 of the negative-electrode tab joint portion 61 and the positive-electrode lower face 45 of the positive-electrode tab joint portion 41 are displaced from each other along the facing direction Z. Specifically, since the negative-electrode tabs 32 are thinner than the positive-electrode tabs 31, the negative-electrode bend portion 111 of the negative conductor 110 is bent such that the negative-electrode lower face 65 of the negative-electrode tab joint portion 61 is arranged closer to the electrode assembly 14 than the positive-electrode lower face 45. In this case, the space between the end face 14a of the electrode assembly 14 and the negative-electrode lower face 65 is defined as a negative-electrode tab space S12, in which the negative-electrode tabs 32 are arranged. The space between the end face 14a of the electrode assembly 14 and the positive-electrode lower face 45 is defined as a positive-electrode tab space S11. The negative-electrode tab space S12 is smaller than the positive-electrode tab space S11.

The present embodiment has the following advantages.

(9) The bend portions 43, 111 of the conductors 40, 110 are bent such that the negative-electrode lower face 65 is closer to the electrode assembly 14 than the positive-electrode lower face 45. This reduces the stress applied to the tabs 31, 32.

Specifically, if the negative-electrode tab space S12 were to be enlarged in correspondence to the positive-electrode tab space S11, the negative-electrode tabs 32 would be more likely to be pulled along the facing direction Z than the positive-electrode tabs 31 since the thickness of the negative-electrode tabs 32 is smaller than that of the positive-electrode tabs 31. In contrast, in the present embodiment, since the negative-electrode tab space S12 is smaller than the positive-electrode tab space S11 along the facing direction Z, the stress applied to the negative-electrode tabs 32 is reduced.

If the positive-electrode tab space S11 were to be decreased in correspondence with the negative-electrode tab space S12, the positive-electrode tabs 31 would be expected to receive a great load along the facing direction Z. In contrast, in the present embodiment, since the positive-electrode tab space S11 is greater than the negative-electrode tab space S12, the stress applied to the positive-electrode tabs 31 is reduced.

Third Embodiment

The present embodiment is different from the first embodiment in the manner in which the positive-electrode tabs 31 are bent and the manner in which the positive conductor 120 is bent. These differences will now be described.

Figure 9:
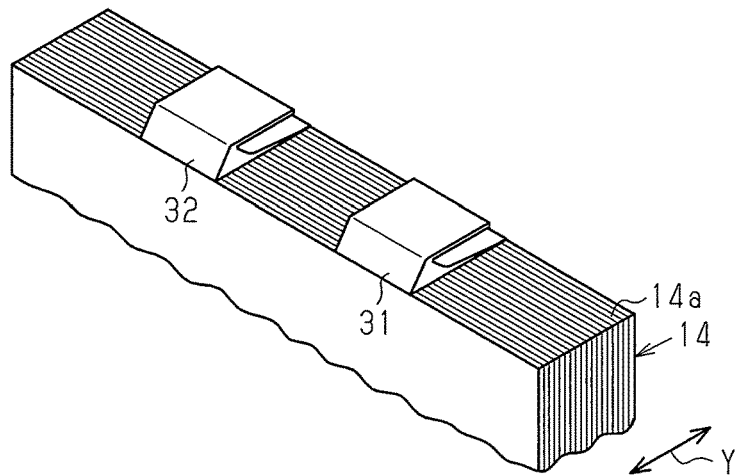
FIG. 9 is a perspective view illustrating positive tabs and a negative electrode according to a third embodiment.

As shown in FIG. 9, the positive-electrode tabs 31 are gathered on one side in the direction of the stacking direction Y of the electrodes 21, 22 and are folded in the gathered state toward the opposite side. However, unlike the first embodiment, the tabs 31 are not folded back toward the side of gathering.

Figure 10A:
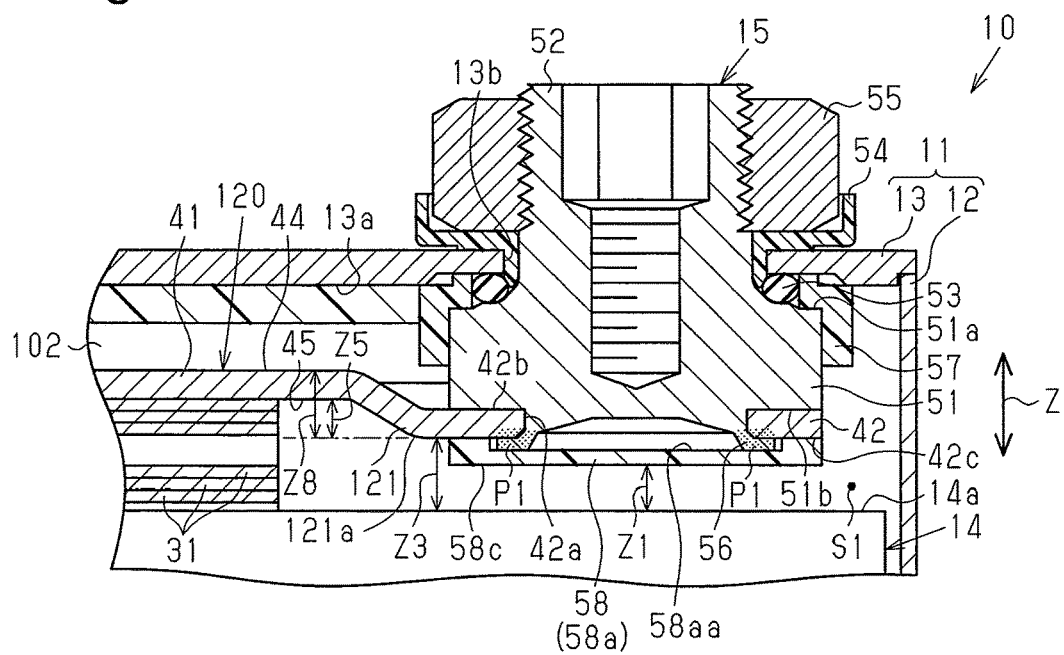
FIG. 10A is a partial cross-sectional view illustrating the positive conductor of the third embodiment.

As shown in FIG. 10A, a positive conductor 120 of the present embodiment includes a positive-electrode bend portion 121, which is bent such that the positive-electrode lower face 45 of the positive-electrode tab joint portion 41 and the negative-electrode lower face 65 of the negative-electrode tab joint portion 61 are displaced from each other along the facing direction Z.

In the present embodiment, the dimension along the facing direction Z of the positive-electrode bend portion 121 (hereinafter, simply referred to as a bend portion dimension Z8) is defined as the distance from the positive-electrode upper face 44 to a part of the positive-electrode bend portion 121 that faces the end face 14a of the positive-electrode upper face 44 (a first facing portion 121a). The first facing portion 121a is a part of the positive-electrode bend portion 121 that faces the end face 14a of the electrode assembly 14. Specifically, the first facing portion 121a is the part closest to the end face 14a and is located at the boundary between the positive-electrode bend portion 121 and the terminal joint portion 42. When a part of the bend portion dimension Z8 that corresponds to the distance along the facing direction Z from the positive-electrode lower face 45 to the first facing portion 121a of the positive-electrode bend portion 121 is defined as a bend portion distance Z5, the bend portion dimension Z8 is the sum of the bend portion distance Z5 and the thickness of the positive-electrode tab joint portion 41.

The bend portion dimension Z8 is adjusted by setting the bend portion distance Z5 to a predetermined value. In the present embodiment, the second positive-electrode insulator 58 corresponds to a first insulating member, which is integrated with the terminal joint portion 42 and located between the terminal joint portion 42 and the end face 14a of the electrode assembly 14.

Suppose that, in the rechargeable battery 10, an impact is applied, for example, to the positive terminal 15 from above, so that the positive terminal 15 and the positive conductor 120, which is integrated with the positive terminal 15, are displaced toward the electrode assembly 14. In this case, the folded-back positive-electrode tabs 31 are gathered toward the electrode assembly 14 by the positive-electrode tab joint portion 41, which is displaced by the impact, so that the positive-electrode tabs 31 contact each other along the facing direction Z.

Figure 10B:
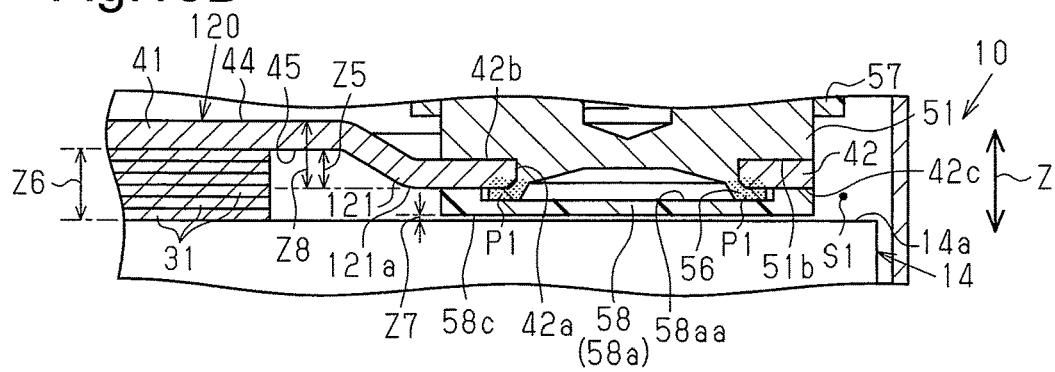
FIG. 10B is a partial cross-sectional view illustrating a state in which the positive conductor has been displaced.

At this time, the distance from the upper face of the uppermost positive-electrode tab 31 to the lower face of the lowermost positive-electrode tab 31 along the facing direction Z is defined as a tab stacking distance Z6 as shown in FIG. 10B. Since the positive-electrode tabs 31 are stacked in a folded-back state, the tab stacking distance Z6 is a value obtained by multiplying the thickness of a single positive-electrode tab 31 by double the number of the positive-electrode tabs 31, that is, the value obtained by doubling the number of the positive electrodes 21, which constitute the electrode assembly 14. When the positive conductor 120 receives and impact and is displaced toward the electrode assembly 14, the displacement of the positive conductor 120 is stopped when the positive-electrode tabs 31 are gathered.

In the rechargeable battery 10, when displacement of the positive conductor 120 is stopped, a short circuit of the positive conductor 120 and the electrode assembly 14 must be avoided. To restrain such a shortcut, it is important that the positive-electrode bend portion 121 (the first facing portion 121a), which is exposed toward the electrode assembly 14, be kept away from the end face 14a of the electrode assembly 14 when displacement of the positive conductor 120 has been stopped.

To prevent the electrode assembly 14 from being damaged when displacement of the positive conductor 120 is stopped, the second positive-electrode insulator 58 must be kept away from the end face 14a of the electrode assembly 14. Thus, the bend portion distance Z5 is set such that, when displacement of the positive conductor 120 is stopped, the lower face 58c of the second positive-electrode insulator 58 does not contact the end face 14a of the electrode assembly 14. The distance along the facing direction Z between the lower face 58c of the second positive-electrode insulator 58 and the end face 14a of the electrode assembly 14 is defined as a separation distance Z7.

The bend portion distance Z5 is set such that, when displacement of the positive conductor 120 is stopped, a clearance exists between the end face 14a of the electrode assembly 14 and the set of the first facing portion 121a of the positive-electrode bend portion 121 and the lower face 58c of the second positive-electrode insulator 58. That is, the bend portion distance Z5 is set such that, in a state in which the positive-electrode tabs 31 are gathered on the side closer to the electrode assembly 14 and displacement of the positive conductor 120 has been stopped, the tab stacking distance Z6 is longer than the sum of the bend portion distance Z5 and the separation distance Z7 (such that the bend portion distance Z5 satisfies a relational expression 1). The state in which the positive-electrode tabs 31 are gathered on the side closer to the electrode assembly 14 refers to a state in which the positive-electrode tabs 31 are gathered toward the electrode assembly 14 along the facing direction Z.

Tab stacking distance Z6>Bend portion distance
    Z5+Separation distance Z7            Relational expression 1

Based on the relational expression 1, the bend portion distance Z5 is set to satisfy a relational expression 2.

Bend portion distance Z5<Tab stacking distance
    Z6−Separation distance Z7            Relational expression 2

The bend portion dimension Z8 is set as the sum of the bend portion distance Z5 and the thickness of the positive-electrode tab joint portion 41.

The present embodiment has the following advantages.

(10) When the positive terminal 15 and the positive conductor 120 are displaced toward the electrode assembly 14, displacement of the positive conductor 120 causes the positive-electrode tabs 31 to be gathered on the side closer to the electrode assembly 14 along the facing direction Z. At this time, the positive conductor 120 is displaced to the position at which the positive-electrode tabs 31 have been gathered along the facing direction Z. If the bend portion distance Z5 of the positive-electrode bend portion 121 is set to a length that satisfies the relational expression 2, the first facing portion 121a of the positive-electrode bend portion 121 and the lower face 58c of the second positive-electrode insulator 58 do not contact the end face 14a of the electrode assembly 14. Further, a clearance is provided between the second positive-electrode insulator 58 and the end face of the electrode assembly 14.

As a result, in the positive electrode 21 and the negative electrode 22, to cover the positive-electrode active material layer 21b with the negative-electrode active material layer 22b, the negative electrode 22 is slightly larger than the positive electrode 21. Even if the negative electrode 22 is closer to the lid 13 than the positive electrode 21, the positive-electrode bend portion 121 is restrained from contacting the negative electrode 22. That is, the displaced positive conductor 120 and the negative electrode 22 are restrained from being short-circuited.

Also, the second positive-electrode insulator 58 and the negative electrode 22 are restrained from contacting each other, so that the negative electrode 22 is restrained from being damaged.

Each of the above illustrated embodiments may be modified as follows.

In the third embodiment, the distance along the facing direction Z from the negative-electrode lower face 65 of the negative conductor 60 to a second facing portion of the negative-electrode bend portion 63, which faces the end face 14a of the electrode assembly 14, is defined as a bend portion distance. Also, when an impact is applied to the negative terminal 16 from above to displace the negative terminal 16 and the negative conductor 60 toward the electrode assembly 14, and the negative-electrode tabs 32 are gathered on the side corresponding to the electrode assembly 14, the distance along the facing direction Z between the end face 14a of the electrode assembly 14 the lower face 86c of the support member 86, which is a second insulating member, is defined as a separation distance. The separation distance is a value obtained by adding up the thicknesses of the total number of the negative-electrode tabs 32 and doubling the added-up value. Further, in the gathered negative-electrode tabs 32, the distance along the facing direction Z from the upper face of the uppermost negative-electrode tab 32 to the lower face of the lowermost negative-electrode tab 32 is defined as a tab stacking distance.

In this case, as in the relational expression 2 of the third embodiment, the bend portion distance in the negative conductor 60 may be set such that the following relational expression is satisfied: Bend portion distance<Tab staking distance−Separation distance.

The circuit breaker 80 may be arranged between the positive terminal 15 and the electrode assembly 14 and integrated with the positive terminal 15. In this case, the positive terminal 15 corresponds to a second terminal, the negative terminal 16 corresponds to a first terminal, the positive-electrode tabs 31 corresponds to a second tabs, the negative-electrode tabs 32 corresponds to a first tabs, the positive conductor 40 corresponds to a second conductor, and the negative conductors 60, 110 each correspond to a first conductor.

The positions to which the terminals 15, 16 are attached do not necessarily need to be on the lid 13, but may be any of the five wall portions of the case body 12. In this case, it is preferable that the electrode assembly 14 be accommodated in the case 11 such that the end face 14a, on which the tabs 31, 32 are located, faces the wall portion of the case body 12 to which the terminals 15, 16 are attached.

In each of the above illustrated embodiments, the negative-electrode bend portions 63, 111 each have a constricted section. However, a part of the positive conductor 40 that is bent to have a crank-shape, or the positive-electrode bend portion 43, may have a constricted section. Also, both the positive-electrode bend portion 43 and the negative-electrode bend portions 63, 111 may each have a constricted section. Alternatively, neither the positive-electrode bend portion 43 nor the negative-electrode bend portion 63, 111 may have a constricted section.

The specific configuration of the circuit breaker 80 is not limited to those disclosed in the above illustrated embodiments, but may be modified as long as the circuit breaker 80 is capable of breaking the current-carrying path.

The lower face 86c of the support member 86 and the lower face 58c of the second positive-electrode insulator 58 may be displaced from each other along the facing direction Z.

The terminal joint portion 42 and the breaker joint portion 62 may be aligned with each other along the facing direction Z.

In the first embodiment, the positive-electrode upper face 44 and the first face 64a of the negative-electrode upper face 64 are arranged on the same plane. However, it suffices if these are close to each other. A state in which the positive-electrode upper face 44 and the first face 64a are close to each other refers to, for example, a state in which the displacement along the facing direction Z between the positive-electrode upper face 44 and the first face 64a is smaller than the displacement along the facing direction Z between the upper face 42b (or the lower face 42c) of the terminal joint portion 42 and the upper face 62a (or the lower face 62b) of the breaker joint portion 62.

In each of the above illustrated embodiments, the negative-electrode upper face 64 has a step. However, the negative-electrode lower face 65 may have a step.

The positive-electrode tab joint portion 41 may have a thick portion and a thin portion. Also, each of the tab joint portions 41, 61 may have a thick portion and a thin portion. Further, the thin portion may be omitted.

In the second embodiment, the thick portion of the negative conductor 110 may be increased in thickness such that the first face 64a and the lower face of the insulating cover 100 contact each other. This configuration suppresses chattering of the insulating cover 100 and increases the cross-sectional area, so that the electrical resistance is reduced.

The thickness of the positive-electrode tab 31 may be smaller than that of the negative-electrode tab 32. In this case, the positive-electrode bend portion and the negative-electrode bend portion may be bent such that the positive-electrode lower face 45 is arranged closer to the electrode assembly 14 than the negative-electrode lower face 65. The point is that the positive-electrode bend portion and the negative-electrode bend portion are preferably bent such that the contact surface contacting the thinner ones of the positive-electrode tabs and the negative-electrode tabs is arranged closer to the electrode assembly 14 than the contact surface contacting the thicker tabs.

The electrode assembly 14 may be a spiral type in which a belt-like positive electrode and a belt-like negative electrode are wound together with a belt-like separator in between to form a stacked structure.

The rechargeable battery 10 may be used for driving a vehicle or as stationary power source.

The shape of the case 11 may be arbitrarily determined, and may be, for example, cylindrical.

In the illustrated embodiments, the rechargeable battery 10 is a lithium-ion battery. However, the rechargeable battery 10 may be another type. The point is that any type of rechargeable battery may be employed as long as ions are allowed between the positive-electrode active material layer 21b and the negative-electrode active material layer 22b, and electric charges can be exchanged. The electricity storage device may be an electric double layer capacitor.

One example obtainable from the above embodiments and modifications will now be described.

When the first tabs are thinner than the second tabs, the first bend portion and the second bend portion are preferably bent such that the first tab joint face is arranged closer to the electrode assembly than the second tab joint face. On the other hand, when the second tabs are thinner than the first tabs, the first bend portion and the second bend portion are preferably bent such that the second tab joint face is arranged closer to the electrode assembly than the first tab joint face.

The invention claimed is:

1. An electricity storage device comprising:
    an electrode assembly, in which one or more first electrodes and one or more second electrodes, which are electrodes, are stacked alternately with one or more separators in between;
    a case, which accommodates the electrode assembly;
    a first terminal and a second terminal, which are exposed to an outside from a wall portion of the case, a part of each terminal protruding toward the electrode assembly, wherein
    each first electrode has a first tab, which has a shape protruding from an end of the first electrode,
    each second electrode has a second tab, which has a shape protruding from an end of the second electrode, and
    the electrode assembly has an end face on which the first and second tabs are located, the end face facing the wall portion,
    a circuit breaker, which is arranged between the second terminal and the electrode assembly and is joined to the second terminal;
    a first conductor, which is joined to the first tabs and the first terminal; and
    a second conductor, which is joined to the circuit breaker and the second tabs, wherein
    the first conductor has a first bend portion, which is bent into a shape of a crank when viewed along a stacking direction of the electrodes,
    the second conductor has a second bend portion, which is bent into a shape of a crank when viewed along a stacking direction of the electrodes,
    a direction that is perpendicular to both the stacking direction of the electrodes and a direction along which the wall portion and the end face face each other is defined as a width direction of the electrode assembly,
    a part of the first terminal and the first tabs are arranged along the width direction of the electrode assembly,
    the circuit breaker and the second tabs are arranged along the width direction of the electrode assembly,
    the first conductor includes
       a terminal joint portion, which is joined to the first terminal, and
       a first tab joint portion, which is arranged closer to the wall portion than the terminal joint portion and includes a first tab joint face joined to the first tabs and a first opposed face facing the wall portion,
    the second conductor includes
       a breaker joint portion, which is joined to the circuit breaker, and
       a second tab joint portion, which is arranged closer to the wall portion than the breaker joint portion and includes a second tab joint face joined to the second tabs and a second opposed face facing the wall portion,
    the breaker joint portion and the terminal joint portion are displaced from each other along the facing direction,
    the first bend portion and the second bend portion are bent such that the first opposed face and the second opposed face approach each other along the facing direction, and
    the second bend portion of the second conductor is narrower than the first bend portion of the first conductor in the stacking direction of the electrodes.

2. The electricity storage device according to claim 1, further comprising an insulating cover, which is arranged between the wall portion and a set of the first tab joint portion and the second tab joint portion,
    wherein the insulating cover contacts both the first opposed face and the second opposed face.

3. The electricity storage device according to claim 1, wherein
    the first tab joint portion and the second tab joint portion are each plate-shaped, and
    at least one of the first tab joint portion and the second tab joint portion includes a thick portion and a thin portion, which have different thicknesses.

4. The electricity storage device according to claim 1, wherein at least one of the first bend portion and the second bend portion has a constricted section.

5. The electricity storage device according to claim 1, wherein the electricity storage device is a rechargeable battery.

6. The electricity storage device according to claim 1, further comprising a first insulating member having an insulating property, which is integrated with the terminal joint portion and located between the terminal joint portion and the end face of the electrode assembly, wherein,
   in a face of the first bend portion that faces the electrode assembly, a part that is closest to the electrode assembly is defined as a first facing portion, and a distance from the first facing portion to the first tab joint face is defined as a bend portion distance,
   in a state in which the first tabs are gathered on a side closer to the electrode assembly and the first conductor, which is joined to the first tabs, has been displaced toward the electrode assembly,
      a distance along the facing direction between the first insulating member and the end face of the electrode assembly is defined as a separation distance, and
      a value obtained by adding up the thicknesses of a total number of the first tabs and doubling the added-up value is defined as a tab stacking distance,
   the electricity storage device comprises a second insulating member having an insulating property, which is integrated with the circuit breaker and located between the circuit breaker and the end face of the electrode assembly,
   in a face of the second bend portion that faces the electrode assembly, a part that is closest to the electrode assembly is defined as a second facing portion, and a distance from the second facing portion to the second tab joint face is defined as a bend portion distance,
   in a state in which the second tabs are gathered on a side closer to the electrode assembly and the second conductor, which is joined to the second tabs, has been displaced toward the electrode assembly,
      a distance along the facing direction between the second insulating member and the end face of the electrode assembly is defined as a separation distance, and
   when a value obtained by adding up the thicknesses of a total number of the second tabs and doubling the added-up value is defined as a tab stacking distance, the following expression is satisfied: (Bend portion distance)<(Tab stacking distance)−(Separation distance).

7. An electricity storage device comprising:
   an electrode assembly, in which one or more first electrodes and one or more second electrodes, which are electrodes, are stacked alternately with one or more separators in between;
   a case, which accommodates the electrode assembly;
   a first terminal and a second terminal, which are exposed to an outside from a wall portion of the case, a part of each terminal protruding toward the electrode assembly, wherein
      each first electrode has a first tab, which has a shape protruding from an end of the first electrode,
      each second electrode has a second tab, which has a shape protruding from an end of the second electrode, and
      the electrode assembly has an end face on which the first and second tabs are located, the end face facing the wall portion,
   a circuit breaker, which is arranged between the second terminal and the electrode assembly and is joined to the second terminal;
   a first conductor, which is joined to the first tabs and the first terminal; and
   a second conductor, which is joined to the circuit breaker and the second tabs, wherein
   the first conductor has a first bend portion, which is bent into a shape of a crank when viewed along a stacking direction of the electrodes,
   the second conductor has a second bend portion, which is bent into a shape of a crank when viewed along a stacking direction of the electrodes,
   a direction that is perpendicular to both the stacking direction of the electrodes and a direction along which the wall portion and the end face face each other is defined as a width direction of the electrode assembly,
   a part of the first terminal and the first tabs are arranged along the width direction of the electrode assembly,
   the circuit breaker and the second tabs are arranged along the width direction of the electrode assembly,
   the first conductor includes a first tab joint portion, which is arranged closer to the wall portion than a terminal joint portion joined to the first terminal, wherein the first tab joint portion has a first tab joint face joined to the first tabs,
   the second conductor includes a second tab joint portion, which is arranged closer to the wall portion than a breaker joint portion joined to the circuit breaker, wherein the second tab joint portion has a second tab joint face joined to the second tabs, and
   the first bend portion and the second bend portion are bent such that the first tab joint face and the second tab joint face are displaced from each other along the facing direction.

8. The electricity storage device according to claim 7, wherein,
   the first conductor has a first tab joint face joined to the first tabs,
   the electricity storage device comprises a first insulating member having an insulating property, which is integrated with the terminal joint portion and located between the terminal joint portion and the end face of the electrode assembly, wherein,
   in a face of the first bend portion that faces the electrode assembly, a part that is closest to the electrode assembly is defined as a first facing portion, and a distance from the first facing portion to the first tab joint face is defined as a bend portion distance,
   in a state in which the first tabs are gathered on a side closer to the electrode assembly and the first conductor, which is joined to the first tabs, has been displaced toward the electrode assembly,
      a distance along the facing direction between the first insulating member and the end face of the electrode assembly is defined as a separation distance, and
      a value obtained by adding up the thicknesses of a total number of the first tabs and doubling the added-up value is defined as a tab stacking distance,
   the second conductor has a second tab joint face joined to the second tabs,
   the electricity storage device comprises a second insulating member having an insulating property, which is integrated with the circuit breaker and located between the circuit breaker and the end face of the electrode assembly, in a face of the second bend portion that faces the electrode assembly, a part that is closest to the electrode assembly is defined as a second facing portion, and a distance from the second facing portion to the second tab joint face is defined as a bend portion distance, in a state in which the second tabs are gathered on a side closer to the electrode assembly and the second conductor, which is joined to the second tabs, has been displaced toward the electrode assembly, a distance along the facing direction between the second insulating member and the end face of the electrode assembly is defined as a separation distance, and when a value obtained by adding up the thicknesses of a total number of the second tabs and doubling the added-up value is defined as a tab stacking distance, the following expression is satisfied: (Bend portion distance)<(Tab stacking distance)−(Separation distance).

9. An electricity storage device comprising:

an electrode assembly, in which one or more first electrodes and one or more second electrodes, which are electrodes, are stacked alternately with one or more separators in between;

a case, which accommodates the electrode assembly;

a first terminal and a second terminal, which are exposed to an outside from a wall portion of the case, a part of each terminal protruding toward the electrode assembly, wherein each first electrode has a first tab, which has a shape protruding from an end of the first electrode, each second electrode has a second tab, which has a shape protruding from an end of the second electrode, and the electrode assembly has an end face on which the first and second tabs are located, the end face facing the wall portion, a circuit breaker, which is arranged between the second terminal and the electrode assembly and is joined to the second terminal;

a first conductor, which is joined to the first tabs and the first terminal; and a second conductor, which is joined to the circuit breaker and the second tabs, wherein the first conductor has a first bend portion, which is bent into a shape of a crank when viewed along a stacking direction of the electrodes, the second conductor has a second bend portion, which is bent into a shape of a crank when viewed along a stacking direction of the electrodes, a direction that is perpendicular to both the stacking direction of the electrodes and a direction along which the wall portion and the end face face each other is defined as a width direction of the electrode assembly, a part of the first terminal and the first tabs are arranged along the width direction of the electrode assembly, the circuit breaker and the second tabs are arranged along the width direction of the electrode assembly, the first conductor includes a plate-shaped first tab joint portion, which is arranged closer to the wall portion than a terminal joint portion joined to the first terminal, wherein the first tab joint portion is joined to the first tabs, the second conductor includes a plate-shaped second tab joint portion, which is arranged closer to the wall joint portion than a breaker joint portion joined to the circuit breaker, wherein the second tab joint portion is joined to the second tabs, and at least one of the first tab joint portion and the second tab joint portion includes a thick portion and a thin portion, which have different thicknesses.

10. The electricity storage device according to claim 9, wherein the second tab joint portion includes the thick portion and the thin portion, which have different thicknesses, the thick portion being at a proximal side of the second tab joint portion and the thin portion being at a distal side of the second tab joint portion.

11. An electricity storage device comprising:

an electrode assembly, in which one or more first electrodes and one or more second electrodes, which are electrodes, are stacked alternately with one or more separators in between;

a case, which accommodates the electrode assembly;

a first terminal and a second terminal, which are exposed to an outside from a wall portion of the case, a part of each terminal protruding toward the electrode assembly, wherein each first electrode has a first tab, which has a shape protruding from an end of the first electrode, each second electrode has a second tab, which has a shape protruding from an end of the second electrode, and the electrode assembly has an end face on which the first and second tabs are located, the end face facing the wall portion, a circuit breaker, which is arranged between the second terminal and the electrode assembly and is joined to the second terminal;

a first conductor, which is joined to the first tabs and the first terminal; and a second conductor, which is joined to the circuit breaker and the second tabs, wherein the first conductor has a first bend portion, which is bent into a shape of a crank when viewed along a stacking direction of the electrodes, the second conductor has a second bend portion, which is bent into a shape of a crank when viewed along a stacking direction of the electrodes, a direction that is perpendicular to both the stacking direction of the electrodes and a direction along which the wall portion and the end face face each other is defined as a width direction of the electrode assembly, a part of the first terminal and the first tabs are arranged along the width direction of the electrode assembly, the circuit breaker and the second tabs are arranged along the width direction of the electrode assembly, the first conductor includes a terminal joint portion, which is joined to the first terminal, and a first tab joint portion, which is arranged closer to the wall portion than the terminal joint portion and has a first tab joint face joined to the first tabs, the electricity storage device comprises a first insulating member having an insulating property, which is integrated with the terminal joint portion and located between the terminal joint portion and the end face of the electrode assembly, in a face of the first bend portion that faces the electrode assembly, a part that is closest to the electrode assembly is defined as a first facing portion, and a distance from the first facing portion to the first tab joint face is defined as a bend portion distance, in a state in which the first tabs are gathered on a side closer to the electrode assembly and the first conductor, which is joined to the first tabs, has been displaced toward the electrode assembly, a distance along the facing direction between the first insulating member and the end face of the electrode assembly is defined as a separation distance, and a value obtained by adding up the thicknesses of a total number of the first tabs and doubling the added-up value is defined as a tab stacking distance, the second conductor includes a breaker joint portion, which is joined to the circuit breaker, and a second tab joint portion, which is arranged closer to the wall portion than the breaker joint portion and has a second tab joint face joined to the second tabs, the electricity storage device comprises a second insulating member having an insulating property, which is integrated with the circuit breaker and located between the circuit breaker and the end face of the electrode assembly, in a face of the second bend portion that faces the electrode assembly, a part that is closest to the electrode assembly is defined as a second facing portion, and a distance from the second facing portion to the second tab joint face is defined as a bend portion distance, in a state in which the second tabs are gathered on a side closer to the electrode assembly and the second conductor, which is joined to the second tabs, has been displaced toward the electrode assembly, a distance along the facing direction between the second insulating member and the end face of the electrode assembly is defined as a separation distance, and when a value obtained by adding up the thicknesses of a total number of the second tabs and doubling the added-up value is defined as a tab stacking distance, the following expression is satisfied: (Bend portion distance)<(Tab stacking distance)−(Separation distance).

* * * * *